Dec. 24, 1940.  E. L. HARRINGTON  2,226,242
APPARATUS FOR FEEDING MATERIAL
Filed Sept. 23, 1939  2 Sheets-Sheet 1
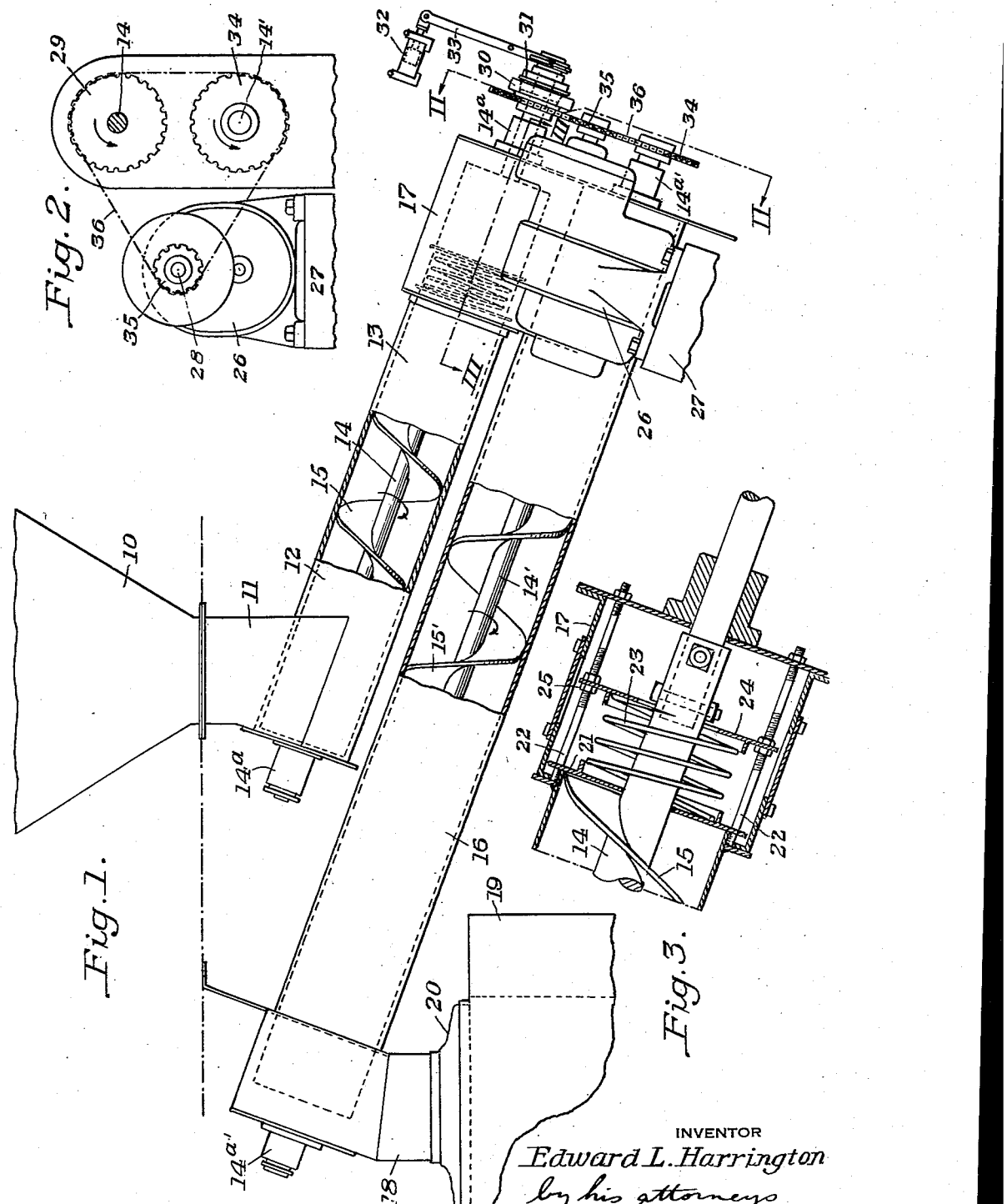
INVENTOR
Edward L. Harrington
by his attorneys
Stebbins, Blenko & Parmelee Dec. 24, 1940.  E. L. HARRINGTON  2,226,242
APPARATUS FOR FEEDING MATERIAL
Filed Sept. 23, 1939  2 Sheets-Sheet 2
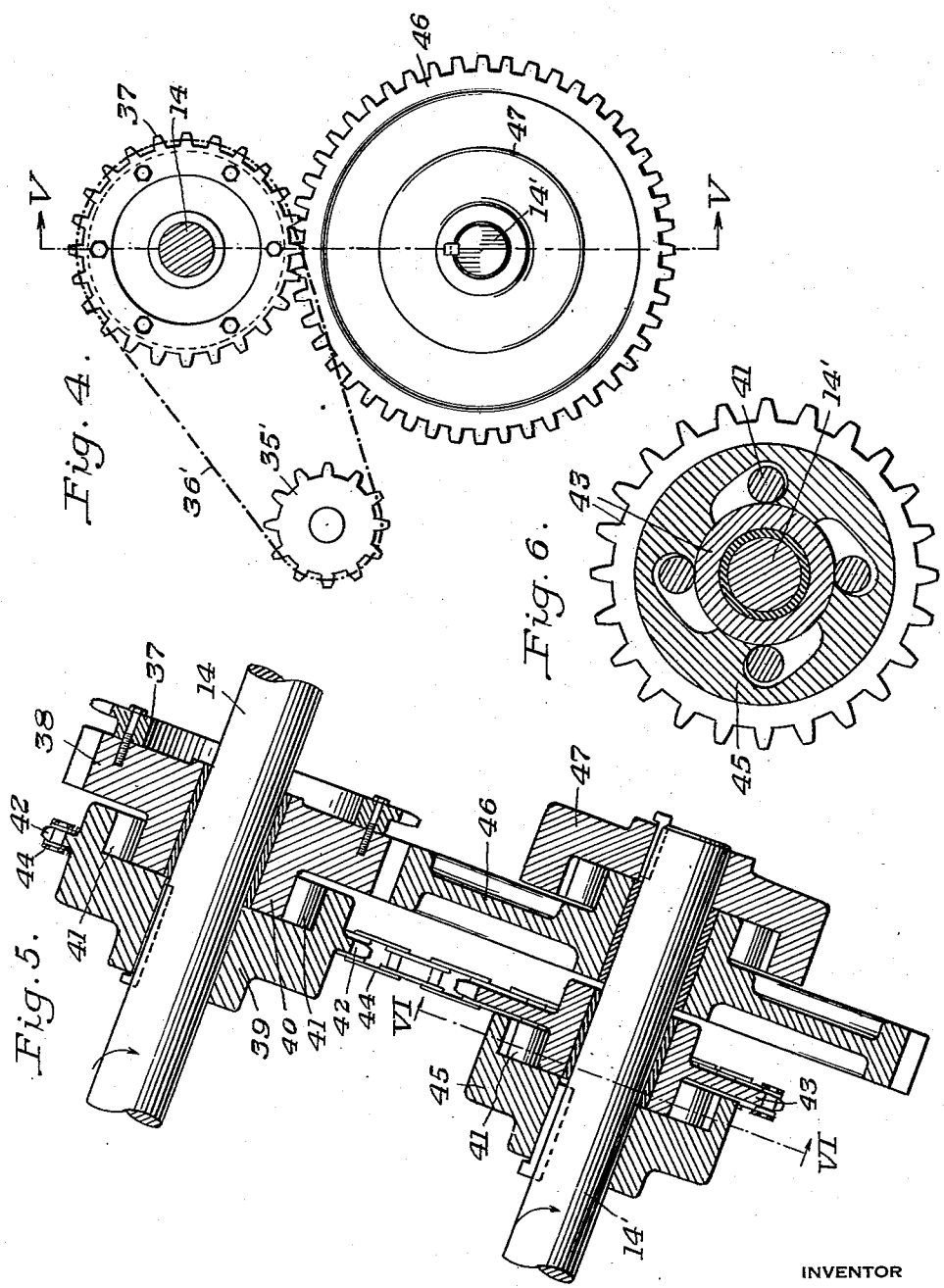
INVENTOR
Edward L. Harrington
by his attorneys
Stebbins, Blenko & Parmelee

Patented Dec. 24, 1940

2,226,242

UNITED STATES PATENT OFFICE 2,226,242

APPARATUS FOR FEEDING MATERIAL

Edward L. Harrington, Pittsburgh, Pa., assignor to Blaw-Knox Company, Pittsburgh, Pa., a corporation of New Jersey Application September 23, 1939, Serial No. 296,261

4 Claims. (Cl. 214—17)

This invention relates to the dispensing of pulverulent material in accurately measured amounts.

It is frequently desirable to weigh out predetermined amounts of fine material such as Portland cement from a storage bin into a receiver on a weighing balance. Such materials, however, have a characteristic which renders accurate measurement difficult. Pulverulent materials such as Portland cement vary greatly in fluidity and consequently in their rate of flow through controlled orifices such as gates or valves. The flow of such materials does not continue uninterruptedly at a uniform rate but is characterized by surges. Sometimes the flow ceases altogether and is then followed by a rapid outpouring. This phenomenon is known as "flushing."

It has been proposed heretofore to render the flow of finely divided solids from a storage bin more uniform by the use of a feeder such as a screw conveyor between the bin and the receiver. If the feeder is inclined to the horizontal and is made long enough or is of special construction, it is effective to a limited extent in damping surges. Among the special features of construction which have been resorted to is the use of a screw conveyor having a reduced diameter at the inlet and extending a short distance therefrom. A further expedient is the use of a screw which has the same diameter throughout but has a shorter pitch at the feed end than at the other portions thereof. A still further expedient is the use of a feed screw throttled at the discharge end by a valve disc adapted to be displaced by the material as it is fed forward by the screw. While these devices improve the constancy of flow and in general produce better performance of automatic weighing devices on which they are used, they are not satisfactory in all conditions, especially where a high degree of accuracy is required and a relatively great flow must be employed to accommodate a fast batching cycle. Also, in many instances, the receiver must be located close to the bin opening so that a screw of sufficient length to embody advantageously the features noted cannot be used. Furthermore, in all the above arrangements, there is a clear communication from the bin outlet to the discharge point of the screw at all times, and occasional surges produce a very noticeable effect, and if they occur near the time of cut-off, result in inaccurate batching.

I have invented a novel apparatus for feeding finely divided solids which maintains the flow of material at a uniform rate and overcomes the disadvantages above-mentioned. The invention is particularly effective in accurately measuring desired amounts of material under automatic control. In a preferred embodiment of the invention, I provide a conveyor extending from a storage bin and a second conveyor adapted to receive material from the first conveyor and extending therefrom to a point of discharge above the receiver of a weighing balance. I operate the conveyors simultaneously to feed material through both conveyors successively until approximately the desired amount of material has been discharged. Thereafter, operation of the first conveyor is discontinued. Further operation of the second conveyor, which may be continued at a reduced rate, discharges the amount of material necessary to make up the desired total amount, whereupon it too is stopped. The conveyors may be controlled by automatic means actuated by the weighing balance. By this mode of operation, a high degree of accuracy in measurement is assured.

The following detailed description of the embodiment above outlined refers to the accompanying drawings illustrating such embodiment. In the drawings, Fig. 1 is a partial side elevation with parts broken away, showing the apparatus I prefer to employ in carrying out the method of my invention;

Fig. 2 is a view partly in end elevation and partly in section along the line II—II of Fig. 1, parts being omitted for clearness;

Fig. 3 is a partial sectional view taken along the line III—III of Fig. 1;

Fig. 4 is a view similar to Fig. 2 showing a modification;

Fig. 5 is a partial sectional view taken along the line V—V of Fig. 4; and

Fig. 6 is a partial sectional view taken along the line VI—VI of Fig. 5.

Referring now in detail to the drawings and, for the present, to Figs. 1 through 3, material contained in a storage bin 10 is adapted to flow through a spout 11 into the upper end of a downwardly inclined screw conveyor 12. The conveyor 12 includes a tubular trough 13 having a shaft 14 journaled longitudinally therein in bearings 14a and provided with helical flights 15.

A conveyor 16 is disposed below and substantially parallel to the conveyor 12, the lower ends of the conveyors being connected by a box-like housing 17 in such manner that material discharged from the lower end of the conveyor 12 will fall into the lower end of the conveyor 16. The conveyor 16 operates to feed material upwardly therealong to a discharge spout 18 above a balance-hung receiver 19. A fabric collar 20 is secured to the mouth of the spout 18 and the top of the receiver 19 to prevent escape of floating particles into the atmosphere. The arrangement of the flights of the conveyors is such that when driven in the proper direction, material is fed downwardly from the bin 10 by the conveyor 12 to the conveyor 16 and upwardly by the latter to the spout 18 and the receiver 19.

The downward inclination of conveyor 12 shown in the drawings is not essential nor preferred except where such a disposition is advantageous to secure screw conveyors of operable length when the receiver is located close to the supply bin. If the receiver were to be located a considerable distance from the bin, conveyor 12 may be horizontal or inclined upwards, and conveyor 16 below it would continue the flow in the same direction.

A valve disc 21 is normally urged against the lower edge of the trough 13 of the conveyor 12. The disc 21 is slidable on guides 22 extending through the housing 17 and is held against the trough 13 by a spring 23 bearing thereon and on a plate 24 secured on the guides 22 by nuts 25. The inner ends of the guides 22 are preferably welded to the trough 13.

Material fed through the trough 13 by rotation of the shaft 14 in the direction indicated by the arrow displaces the disc 21 against the pressure of the spring 23 and falls downwardly through the housing 17 into the trough of the conveyor 16, the top of which has a suitable receiving opening at the lower end thereof. The material is then advanced through the trough of the conveyor 16 by rotation of the latter in the direction indicated by the arrow and discharged from the spout 18. As shown in the drawings, the conveyors 12 and 16 are so constructed that they feed material when their shafts are driven in the same direction.

The drive for the conveyor shafts includes a motor-reducer unit 26 mounted on any suitable foundation 27 and having a slow-speed or output shaft 28. A sprocket 29 is loose on the shaft 14 and has a cone clutch member 30 secured thereto. A cooperating clutch member 31 is movable axially on the shaft 14 by a pneumatic piston and cylinder 32 and a connecting lever 33. A sprocket 34 is keyed to the shaft 14' of the conveyor 16. The sprockets 29 and 34 are driven by the motor-reducer unit 26 through a sprocket 35 on the shaft 28 and a chain 36 trained around the several sprockets. The clutch member 31 normally engages the clutch member 30 by virtue of a suitable spring or the like (not shown). The shafts 14 and 14' of the two conveyors are thus normally driven in the same direction on operation of the motor 26 and serve to feed material downwardly and upwardly from the bin 10 to the receiver 19 in the manner already described.

When the amount of material in the receiver 19 approaches the amount which it is desired to deliver in a single batch, the cylinder and piston 32 are operated to cause disengagement of the clutch members 30 and 31. The simultaneous operation of the conveyors 12 and 16 should obviously be continued at least slightly beyond the point at which the material remaining in the conveyor 16 is sufficient to bring the amount of material in the receiver 19 to precisely the desired amount.

The admission of fluid to the cylinder 32 may conveniently be controlled by an electromagnetic valve. This electromagnetic valve may readily be energized by contact-making mechanism associated with the weighing balance. Such mechanism is described and claimed in the copending application of William H. Venable, Ser. No. 286,617. It will be understood, however that the clutch may also be manually controlled by the weigh-man.

Continued operation of the motor 26 drives the screw of the conveyor 16 only. If desired, furthermore, the speed of the motor 26 may be reduced after stoppage of the screw of the conveyor 12, in order that additional material be discharged into the receiver 19 at a reduced rate. In any case, operation of the conveyor 16 continues until precisely the desired amount of material has been discharged in the receiver, whereupon the conveyor 16 is stopped. The receiver 19 may then be dumped and a second weighing operation commenced.

It will be apparent that with the system described, there is no through communication between the bin and the receiver during the final stage of the measurement because the valve disc 21 closes as soon as the screw of the conveyor 12 stops and even without this provision, a downward surge through the conveyor is not transmitted through the upward conveyor 16. Inaccurate weighing which might result from surges occurring during the final weighing stages is thus prevented. The flow of material through both the conveyors continues at a substantially uniform rate so long as they are both in operation. The down-feeding conveyor 12 is preferably somewhat smaller in diameter than the upfeeding conveyor 16 or has a screw with a shorter pitch than that of the conveyor 16.

While the invention has been described with particular reference to measuring out material in batches, it will be evident that it is also applicable to a continuous feeding operation and is effective when so used, to maintain a substantially uniform flow of material as opposed to the erratic flow characterized by surges, which would otherwise be experienced.

Referring now more particularly to Figs. 4 through 6, a modified drive for the conveyor shafts 14 and 14' comprises a sprocket 37 secured to a pinion 38 which is loose on the shaft 14. The sprocket 37 as shown diagrammatically in Fig. 4, is connected by a chain 36' to the motor sprocket indicated at 35'. A unidirectional clutch 39 is keyed to the shaft 14 and cooperates with the hub of the pinion 38 indicated at 40. Wedging rollers 41 between the clutch 39 and the hub 40 cause the shaft 14 to be driven in the direction indicated by the arrow when the pinion 38 is driven in that direction. When the pinion is reversed, the shaft 14 remains stationary. The clutch 39 is of the type well-known to the trade as an over-running clutch but may be of any suitable type.

Sprocket teeth 42 are formed on the clutch 39 whereby the latter drives a sprocket 43 loose on the shaft 14' through a chain 44. A unidirectional or over-running clutch 45 cooperates with the sprocket 43 in the same manner that the clutch 39 cooperates with the pinion 38. In other words, the clutch is effective to drive the shaft 14' in the direction indicated by the arrow when the sprocket 43 is driven in that direction.

The shaft 14', however, may be driven in the other direction without actuating the sprocket 43.

A gear 46 loose on the shaft 14' cooperates with an over-running clutch 47 keyed thereto in such manner that the shaft may be driven in the direction indicated by the arrow when the gear 46 turns in that direction. Rotation of the gear 46 in the other direction, however, does not effect rotation of the shaft.

It will be apparent from the foregoing that counter-clockwise rotation of the sprocket 35' will effect rotation of the sprocket 37 and pinion 38 in the same direction. The clutch 39 is thereupon effective to turn the shaft 14. Similarly the clutch 45 turns the shaft 14'. While the pinion 38 turns the gear 46 in a clockwise direction, the clutch 47 is ineffective under such circumstances and the gear 46 merely turns idly on the shaft 14'. As explained with reference to Fig. 1, simultaneous rotation of the shafts 14 and 14' in the same direction causes the conveyors 12 and 16 to deliver material to the receiver 19. When approximately the desired amount has been delivered to the conveyor 19, the necessary additional amount is delivered by reversing the motor 26. This reversal may be accomplished automatically, in the same manner as operation of the cylinder 32, or manually if desired.

When the motor is reversed and the sprocket 37 and pinion 38 are rotated in the clockwise direction, the clutch 39 is ineffective and the shaft 14 remains stationary. The gear 46, however, is driven in a counter-clockwise direction and operates through the clutch 47 to turn the shaft 14' in that direction. The rotation of the shaft 14' is not transmitted to the shaft 14 because the clutch 45 is effective only to drive the shaft 14' from the sprocket 43. It will be apparent from the foregoing that both the shafts 14 and 14' are driven in the counter-clockwise direction when the sprocket 35' turns in that direction and that when the sprocket 35' is reversed, only the shaft 14' is driven, and in the same direction. Preferably, the tooth ratio of gears 38 and 46 is made less than that of sprockets 42 and 43, such that conveyor 16 operates at reduced speed when the motor is merely reversed, to cause the material to be fed slowly during the final stage of the weighing operation.

It will be apparent that the invention is characterized by numerous advantages over the expedients which have been adopted previously in an effort to avoid inaccurate weighing caused by surges or non-uniform flow of the material. The apparatus is quite flexible as to the relative locations of the storage bin and weighing receiver and is, furthermore, relatively simple and inexpensive. The apparatus is also well adapted for automatic control by the weighing balance or scale itself. The invention greatly improves the accuracy with which material may be weighed out in batches. The rate of flow of material into the receiver is decreased automatically toward the end of the dispensing operation, as the amount of material remaining in the second conveyor decreases. The apparatus thus prevents the discharge of excessive amounts of material.

Although I have illustrated and described a preferred embodiment and modification of the invention, it will be understood that changes in the construction and arrangement of parts may be made without departing from the spirit of the invention or the scope of the appended claims.

I claim:

1. Apparatus for accurately dispensing pulverulent material from a storage bin comprising, a screw conveyor receiving material from the bin and conveying it therefrom in a generally lateral direction, a valve at the end of said screw conveyor, normally closed but capable of being opened by pressure of material pushed against it by the screw in said first mentioned conveyor, a screw conveyor with its receiving end communicating with the discharge of the first mentioned conveyor and receiving material therefrom, a discharge connection between the end of said second conveyor and a batcher in which the material may be weighed, a motor for driving the screws of said conveyors, and driving mechanism between said motor and said screws whereby the rotation of said motor in one direction operates both screws, and reversal of the direction of said rotation operates the second screw only, in the same direction as when both screws are rotated.

2. Apparatus for accurately dispensing pulverulent material from a storage bin comprising a screw conveyor receiving material from the bin and conveying it therefrom in a generally lateral direction, a screw conveyor with its receiving end communicating with the discharge of the first-mentioned conveyor and receiving material therefrom, a discharge connection between the end of said second conveyor and a batcher in which the material may be weighed, a motor for driving the screws of said conveyors, and driving mechanism between said motor and said screws whereby the rotation of said motor in one direction operates both screws, and reversal of the direction of said rotation operates the second screw only, in the same direction as when both screws are rotated.

3. Apparatus for accurately dispensing pulverulent material from a storage bin comprising a screw conveyor receiving material from the bin and conveying it therefrom in a generally lateral direction, a screw conveyor with its receiving end communicating with the discharge of the first-mentioned conveyor and receiving material therefrom, a motor for driving the screws of said conveyors, and driving mechanism between said motor and said screws whereby the rotation of said motor in one direction operates both screws, and reversal of the direction of said rotation operates the second screw only, in the same direction as when both screws are rotated.

4. Apparatus for accurately dispensing pulverulent material from a storage bin comprising a conveyor receiving material from the bin and conveying it therefrom in a generally lateral direction, a conveyor with its receiving end communicating with the discharge of the first-mentioned conveyor and receiving material therefrom, a motor for driving said conveyors, and driving mechanism between said motor and said conveyors whereby the rotation of said motor in one direction operates both conveyors, and reversal of the direction of said rotation operates the second conveyor only, in the same direction as when both conveyors are operated.

EDWARD L. HARRINGTON.